No. 888,854. PATENTED MAY 26, 1908.
F. L. SHELDON.
JACKET FOR SPHERICAL STRUCTURES.
APPLICATION FILED OCT. 1, 1907.
2 SHEETS—SHEET 1.
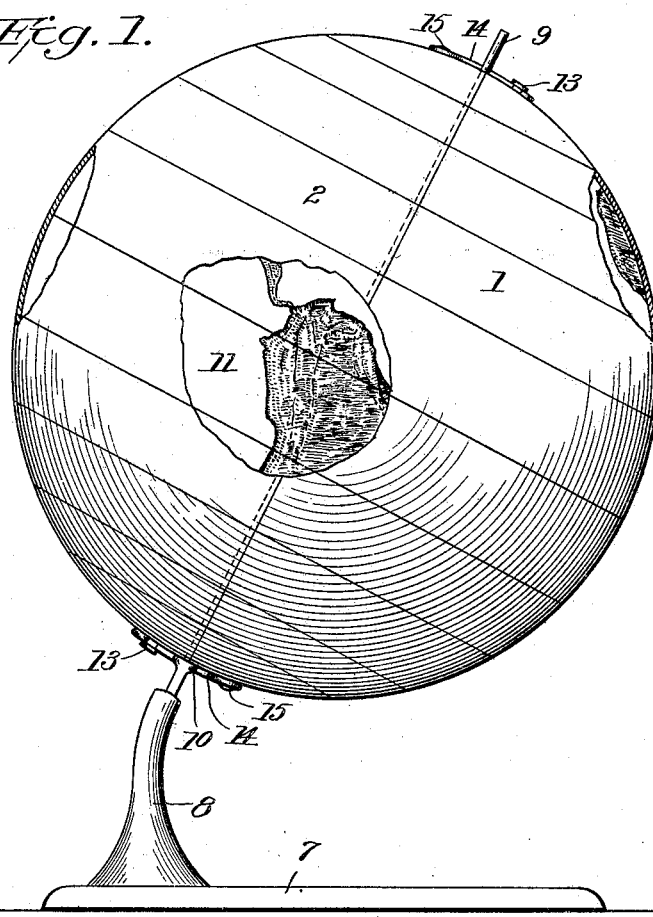
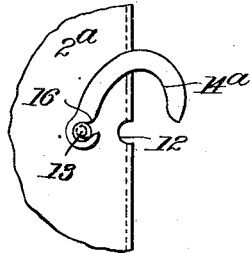
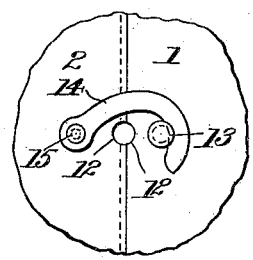
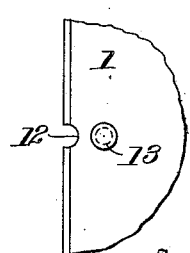
Witnesses
C. N. Walker
J. T. Walker
Inventor
Fred L. Sheldon.
By E. E. Vrooman,
his Attorney.

No. 888,854. PATENTED MAY 26, 1908.
F. L. SHELDON.
JACKET FOR SPHERICAL STRUCTURES.
APPLICATION FILED OCT. 1, 1907.
2 SHEETS—SHEET 2.
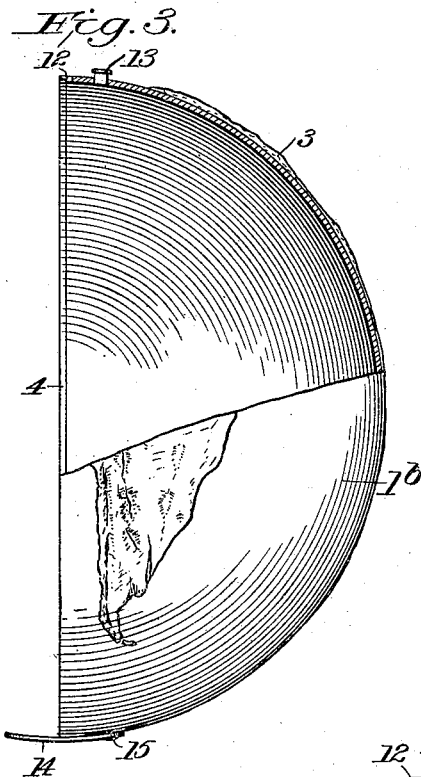
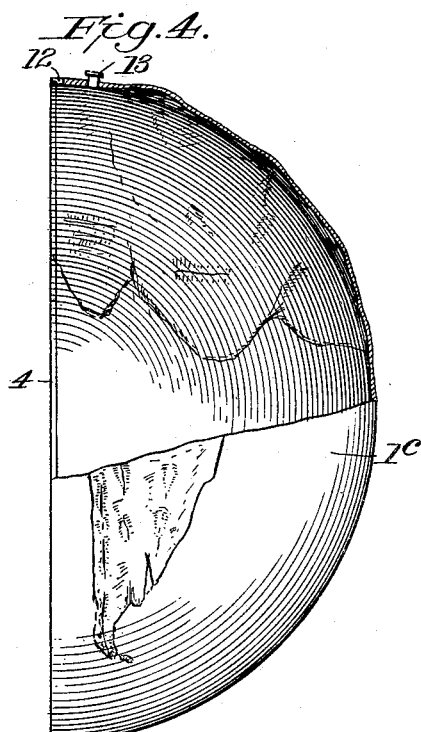
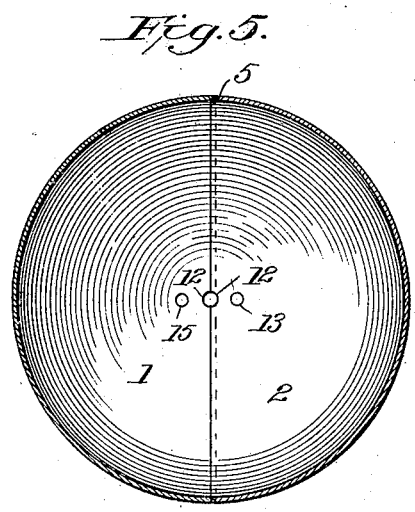
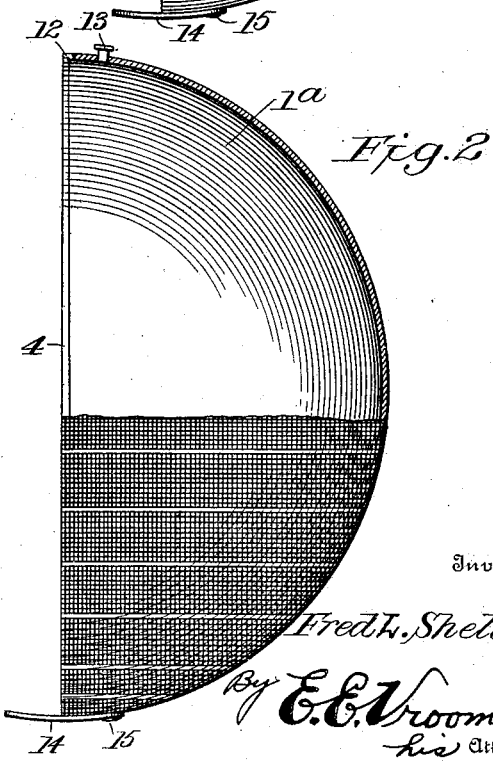
Witnesses
C. H. Walker
J. T. Walker
Inventor
Fred L. Sheldon
By E. E. Vrooman
his Attorney.

UNITED STATES PATENT OFFICE.

FRED L. SHELDON, OF TACOMA, WASHINGTON.

JACKET FOR SPHERICAL STRUCTURES.

No. 888,854.　　　Specification of Letters Patent.　　　Patented May 26, 1908.

Application filed October 1, 1907. Serial No. 395,439.

*To all whom it may concern:*

Be it known that I, FRED L. SHELDON, a citizen of the United States, residing at Tacoma, in the county of Pierce and State of Washington, have invented certain new and useful Improvements in Jackets for Spherical Structures, of which the following is a specification, reference being had therein to the accompanying drawing.

This invention relates to improvements in globe-jackets or jacket-maps, which may be placed upon an ordinary solid globe, or which jackets may be so mounted as to constitute a globe without employing an ordinary globe.

The advantages of a globe formed of jackets over a flat blackboard or map are many, as it will be obvious that any markings or illustrations can be placed upon the jackets which may be positioned upon a flat blackboard or map, and my jacket-maps will give the student the correct impression, whereas a flat blackboard, used for geographical illustrations, gives a wrong impression, which tends to confuse the student.

The object of the invention is the peculiar construction of jackets or jacket-maps, which, when secured together, will constitute either a jacket or covering for an ordinary globe, or a complete globe in itself, whereby one jacket may be used by a student independent of the remaining jackets forming a complete blackboard or globe, and then after the student has placed the desired subject-matter upon the jacket, said jacket can be quickly assembled with the other jackets employed in constructing the globe for completing the entire structure, or, if one jacket becomes injured, it can be quickly replaced with a new jacket which does not necessitate the destroying or abandonment of the other jacket or jackets of the globe-like structure, as would be the case with the ordinary single-piece spherical-blackboard or globe.

Another object of the invention is the construction of jackets, which, when assembled, will form a globe or blackboard, and providing these jackets with peculiar fastening means for securing the same together, so that the jackets can be separated and the student or students can rest the same upon a table and draw upon each jacket or section independent of the others, or place suitable plastic material upon the jackets for illustrating the topography of the earth's surface. It will be noted that a material advantage is obtained by laying the jackets upon a flat support, as said jackets can not rotate, and, therefore, will furnish a comparatively fixed or firm foundation, which will enable a student to execute his work well.

With these and other objects in view, the invention consists of certain novel constructions, combinations, and arrangements of parts, as will be hereinafter fully described and claimed.

In the drawings: Figure 1 is a view in side of a plurality of my jackets assembled in the shape of a black-board or globe; the jackets, in this instance, being positioned upon an ordinary solid globe. Fig. 2 is a view in side elevation of a jacket which is provided with a suitably coated outer surface, whereby the same is employed, as a blackboard upon which the student may make geographical or other illustrations. Fig. 3 is a view in side elevation of a jacket upon which may be placed plastic material, as for instance, clay, for illustrating the topography of the earth's surface. Fig. 4 is a view in side elevation of a jacket, which has the topographical outlines of the earth's surface formed in the material of which said jacket is formed. Fig. 5 is a transverse, sectional view of a plurality of jackets constructed in accordance with the present invention. Fig. 6 is an enlarged, detail view of one embodiment of the fastening means for securing each two of the jackets together. Fig. 7 is a fragmentary view of one of the jackets and showing another embodiment of the fastening means, preferably, a cam-catch, while Fig. 8 is a fragmentary view of one of the jackets showing the stud engaged by the cam catch.

It is to be understood that my invention relates to jacket-maps or jackets, which may be formed of any suitable material, and that one of the jacket-maps may be employed principally for the study of agricultural resources of the country or of the world. These agricultural resources can be properly designated on said jacket or map by certain colors or other means. On other jacket-maps, the mineral resources may be suitably designated, and still on others, raised work to show the topography of the world or countries, and on one or more maps, there may be suitable designating means employed for studying history, as for instance, the coloring of the jacket for indicating where great battles were fought, marches made by armies, and naval engagements, etc. It will be readily understood that possibilities are unlimited, and the advantages great, by employing the jackets or sections over flat maps. Furthermore, the jackets or sections may be employed as a blackboard for enabling the student or teacher to draw thereon; the drawing may be erased at will, or remain, as desired, for the edification of the student or others. It may be preferable, when using the jackets, in a course of drawing to use several sets of said jackets. For instance, one set having the fixed line of latitude and longitude thereon, also placing of the different countries, States, provinces and other geographical illustrations, and then permit the student to fill in the proper names and dates. This set would probably be for the beginner during the first lesson; on the next set employed, some of the subject-matter used on the first set could be eliminated, and on the succeeding set still less could be permanently shown, thereby permitting the student to fill in the different geographical and historical illustrations, as he becomes more advanced. Finally for the finished student, a plain set of jackets or sections may be employed with simply fixed lines of latitude and longitude to serve as a guide for the student, that he may correctly place the lines for designating the continents, countries and other geographical illustrations upon said jacket.

If a student should desire to remove a jacket from the spherical-structure or globe, constituted by a plurality of jackets, before the desired illustrations upon the globe are completed, this could be permitted and another student could substitute for the removed jacket or section, his jacket, as will be obvious from the following specific description of the structure.

In carrying out my invention, I have illustrated in the accompanying drawings several forms of my jacket-maps which are employed either as a spherical-jacket or covering for a globe in constructing a spherical blackboard or globe, which jacket-globe is to be employed without an ordinary globe; therefore, it will only be necessary to describe generically the jackets or sections, although I will specifically describe the preferred type of fastening means for securing the jackets together, and the means by which the jackets when secured together, are revolubly mounted upon a support.

Referring particularly to Fig. 1, 1 and 2 designate a plurality of jacket-maps. In Fig. 2, the jacket or section 1ª is provided with a suitable coating, forming a blackboard. In Fig. 3, jacket-map 1ᵇ is, preferably, provided with an unruled or smooth surface upon which the student may place any suitable plastic material 3, as for instance, clay, and work in this clay the mountains, valleys, etc., to illustrate the topography of any particular portion of the earth's surface. In Fig. 4, the jacket-map 1ᶜ is, preferably, provided with the raised portions and indentations for illustrating the mountains, rivers, valleys, etc., instead of having the student work the same thereon with plastic material, as illustrated in Fig. 3. It is to be noted that these jackets 1ª, 1ᵇ, and 1ᶜ are provided with an inner, annular recess 4, into which fits the annular, inner tongue 5 of the coöperating jacket 2, see Fig. 5. It will, therefore, be noted that one jacket or section is provided with an annular recess, while the other coöperating jacket or section is provided with a tongue, which fits snug and forms a perfect seam which will not prevent the student from performing his work well.

The support for the jackets, when assembled in the form of a spherical blackboard or globe comprises, preferably, a base 7 having a standard 8, and rising from the standard 8 is, preferably, an inclined rod 9, which rod 9 is provided near the standard 8 with an enlarged portion 10, acting as a stop for preventing the blackboard or globe from sliding down against the standard 8. In Fig. 1, I have shown mounted upon the rod 9 an ordinary solid or single-piece globe 11, which is surrounded by a plurality of my jackets.

To permit the adjustment of the jackets upon the rod 9, each section is provided upon opposite portions with semi-circular recesses 12, which recesses, when the jackets are assembled, form apertures, see Figs. 5 and 6. The rod 9 extends through these apertures, and permits the jackets to freely revolve thereon.

Upon opposite portions of and contiguous to the apertures, I form fastening means for securing the sections together. The fastening means preferably comprises headed studs 13 one secured upon each section upon opposite sides, and cam-catches 14 are pivotally mounted by means of rivets, or other suitable fastening means 15, upon the sections. These cam-catches are adapted to engage the headed studs, and as said catches are forced over the studs, owing to their structure, they will clamp the section tightly together and securely fasten them in their assembled position. I, preferably, secure a cam-catch 14 to each section and a stud 13 to each section, upon opposite sides, because I have found that this will give a more rigid and positive lock for securing the sections together than would be the case if the cam-catches were carried by one section. However, this arrangement is entirely optional with the constructor. It is to be noted that the cam-catches are slightly concaved to conform to the contour of the globe or blackboard.

In Fig. 7 I have shown the jacket 2ª provided with a headed stud 13, and mounted upon the stud 13, is a cam-catch 14ª, which is provided at one end with a notch 16, whereby the cam-catch 14ª is detachably secured at one end to the stud 13, while its other end may pass over stud 13 on the jacket 1, whereby the two jackets or sections are secured together. It will be noted that in this embodiment, I have provided detachable fastening means in the form of removable cam-catches, so that if it is not desired to have the jackets provided with cam catches fixed thereto, removable catches can be used so that they can be entirely detached, when the student is working with the jackets upon a flat support, prior to assembling the same in the form of a sphere.

In the foregoing description, I have referred to my invention as a "blackboard" or "globe", and I desire it to be understood that I use these terms in a generic sense, as my invention relates to a jacket-structure of the globe-type, revolubly mounted upon a support, and which is to be employed by students or any person, in geographical study and research for conveying to the mind the correct impression of the earth's surface, and any information relating thereto that the instructor or teacher may desire to convey to the mind of the student or pupil.

What I claim is:

1. In a device of the character described, the combination with a support, provided with a rod, said rod having an enlarged portion near its lower end, of a globe-like structure formed of jackets, revolubly mounted upon said rod, each jacket of said structure provided with recesses upon opposite portions thereof, the recesses of the sections constituting registering apertures when the jackets are assembled, and fastening means carried by and positioned upon opposite sides of and partly surrounding said rod, said fastening means securing said jackets together.

2. In a device of the character described, the combination of a support, provided with an inclined, vertical rod, a globe-like structure formed of jackets, revolubly mounted upon said rod, one of said jackets provided with an annular recess formed in its inner face, the other jacket provided with an annular tongue extending from its inner face, the tongue fitting into said recess, and detachable fastening means positioned upon opposite sides of said globe-like structure and securing said jackets together.

3. In a device of the character described, the combination with a support, of a rod carried by said support, a globe-like structure revolubly mounted upon said rod, said structure comprising hollow semi-spherical jackets, one of said jackets provided with an annular recess, the other jacket provided with an annular tongue fitting into said recess, concaved cam-catches pivotally mounted upon said jackets, and means carried by said jackets and engaging said cam-catches, whereby said catches secure said jackets together.

4. In a device of the character described, the combination with a support, of a globe-like structure formed of jackets, revolubly mounted upon said support, studs carried by said jackets, cam-catches overlapping the meeting edges of said jackets and engaging said studs and securing the jackets together, each catch provided at one end with a gradually tapering inner face, and at its opposite end with an inwardly-extending notch.

5. In a device of the character described, the combination with a support provided with an inclined rod, of semi-spherical jackets revolubly mounted upon said rod, each jacket provided with a pair of semi-circular notches, the notches of the jackets constituting registering apertures through which said rod extends, studs formed upon said jackets contiguous to said rod, and concaved cam-catches positioned against the outer face of the jackets and overlapping their meeting edges and engaging said studs and securing said jackets together.

6. In a device of the character described, the combination with a support, of a globe-like structure revolubly mounted upon said support and comprising a plurality of jackets, one jacket provided with a recess and the other jacket provided with a tongue positioned within said recess, and cam locking-means engaging and securing said jackets together.

7. In a device of the character described, the combination with a support provided with a rod, of a globe-like structure composed of a plurality of jackets journaled upon said rod, and fastening means positioned upon opposite sides of said globe-like structure and extending partly around the rod and conforming to the shape of the outer face of the globe-like structure and detachably securing said jackets together.

8. In a device of the character described, the combination with a support provided with a rod, of a globe-like structure composed of jackets revolubly mounted upon said rod, each jacket provided with a stud contiguous to the rod, and fastening means extending partly around the rod, engaging all of the studs for securing the jackets together.

9. In a device of the character described, the combination with a support, of a globe-like structure revolubly mounted upon said support, said globe-like structure comprising jackets or sections, said jackets provided with studs, and fastening means lying against the outer surface of the jackets and engaging said studs for securing the jackets together.

In testimony whereof I hereunto affix my signature in presence of two witnesses.

FRED L. SHELDON.

Witnesses:
　EMIL U. STEUBERG,
　J. B. KEENER.